(No Model.) 2 Sheets—Sheet 2.
W. ALBACH.
APPARATUS FOR USE IN BARRELING BEER OR OTHER LIQUIDS.
No. 477,096. Patented June 14, 1892.
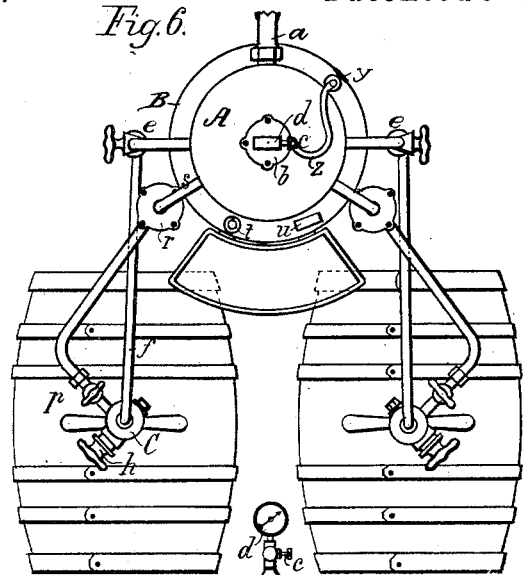
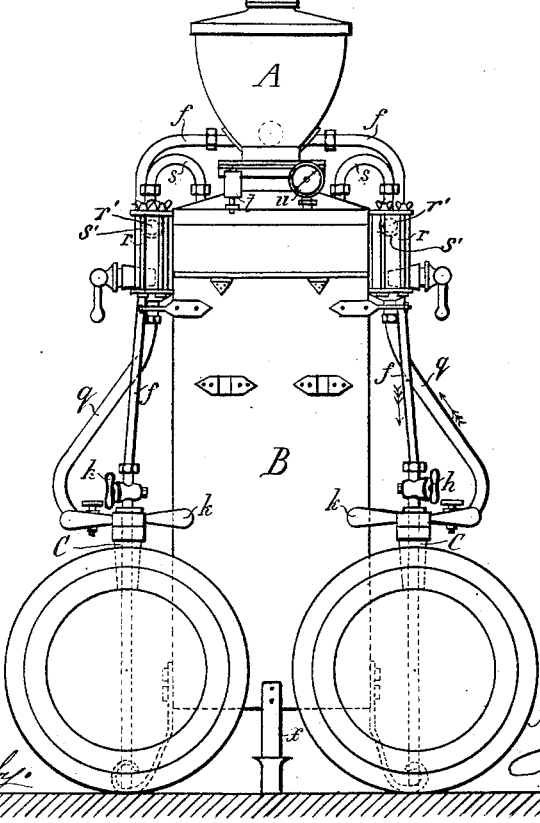

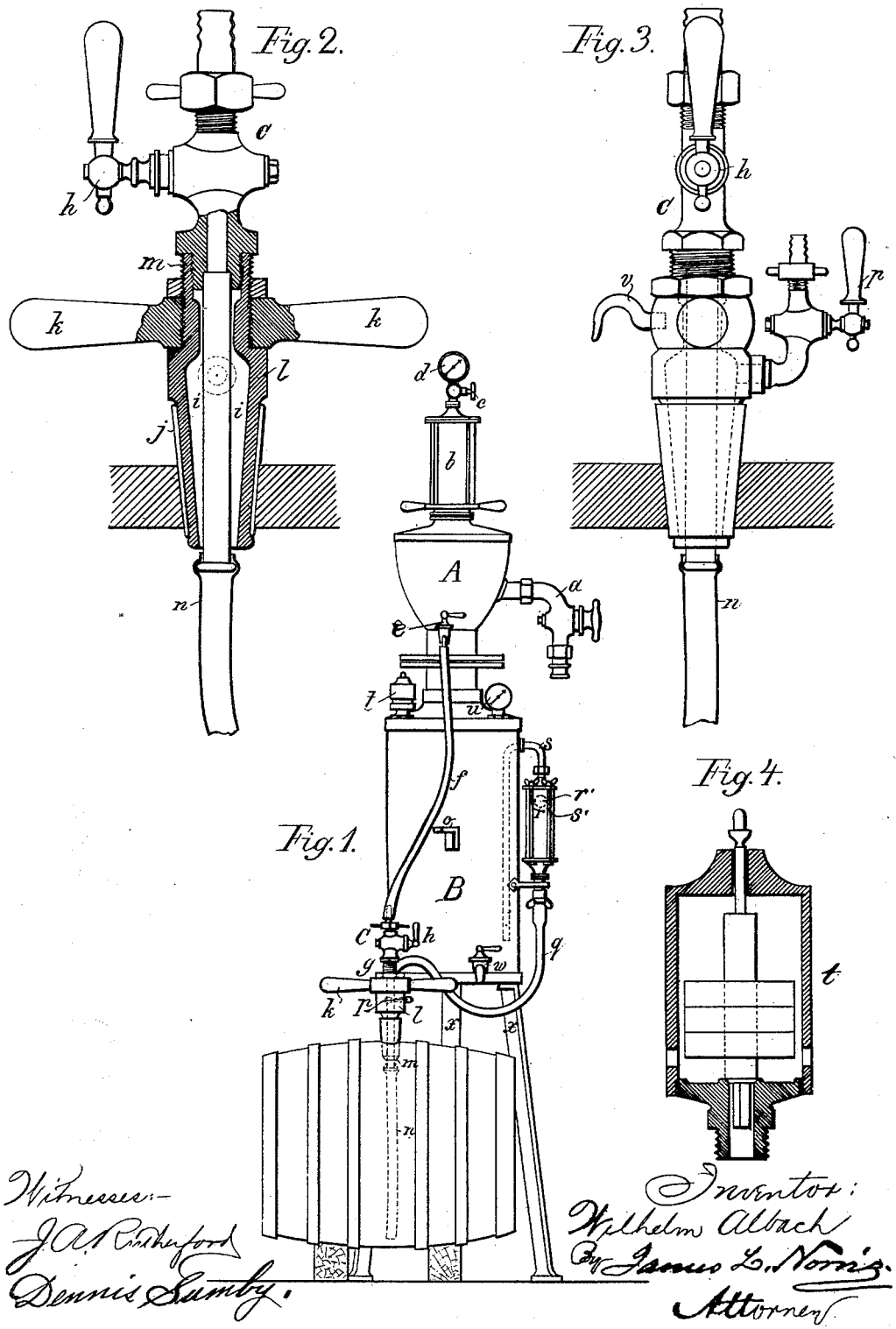

UNITED STATES PATENT OFFICE.

WILHELM ALBACH, OF HÖCHST-ON-THE-MAIN, GERMANY.

APPARATUS FOR USE IN BARRELING BEER OR OTHER LIQUIDS.

SPECIFICATION forming part of Letters Patent No. 477,096, dated June 14, 1892.

Application filed November 28, 1890. Serial No. 372,978. (No model.)

*To all whom it may concern:*

Be it known that I, WILHELM ALBACH, coppersmith, a subject of the Emperor of Germany, and a resident of Höchst-on-the-Main, in the Empire of Germany, have invented certain new and useful Improvements in Apparatus for Use in Barreling Beer and other Liquids, of which the following is a specification, reference being had to the accompanying drawings.

This invention relates to apparatus designed for use in barreling beer and other liquids. It is well known that beer on being bunged up, which takes place about a week prior to the barreling, receives an addition which gives rise to the formation of carbonic acid, so that it will become aerated. The pressure produced in the store-cask must always be the same, as carbonic acid is set free and produces effervescence when the pressure is reduced from any cause. In case the beer is mature for barreling without being fit for use, such a considerable pressure will be produced in the store-cask that it becomes almost an impossibility to fill the beer into a trade-barrel without counter-pressure by reason of the enormous effervescence caused when the pressure is removed—that is to say, at the moment when the beer leaves a filter or an ordinary barreling apparatus. In the improved apparatus constructed according to my aforesaid invention the carbonic acid, a certain quantity of which is disengaged in every movement of the beer, serves for the production of the required counter-pressure. Beer subject to high pressure in the store-cask can by this means be barreled without causing froth. Therefore the apparatus operating under economical conditions, is of great importance for the brewing industry.

In the accompanying drawings, Figure 1 shows an elevation of the improved apparatus in connection with a barrel to be filled. Figs. 2 and 3 show a section and elevation of a faucet. Fig. 4 represents a section of a valve arranged on the air-vessel. Figs. 5 and 6 represent an elevation and plan of the apparatus in connection with two trade-barrels to be filled.

The said apparatus comprises two superposed vessels or receptacles A and B, with their accessory parts and a faucet C. To the upper receptacle A leads a pipe $a$, provided with a cock, and connected with the store-cask or with the outlet of a filter by means of a flexible pipe. Upon the receptacle A is placed a gage-glass $b$, which carries a three-way cock $c$ and a pressure-gage $d$. At the lower end of the receptacle A is a cock $e$, which is in connection through a flexible pipe $f$ with the cock $h$ of the aforesaid faucet C. This cock $h$, which is screwed tightly into the faucet C, has secured to it a short pipe $m$, upon the lower extremity of which is slid a flexible pipe $n$, extending to the bottom of the barrel to be filled. The pipe $m$ is surrounded by a brass cone $l$ in such a manner that between this cone and the pipe $m$ will remain an intermediate space $i$, which is open below but closed above and which is in connection with a gage-glass $r$ through the medium of a small cock $p$ and a flexible pipe $q$. The gage-glass $r$ is connected with the air-vessel B through a pipe $s$, which extends nearly to the bottom of the same. This vessel is supported upon feet $x$ and is provided with a small air-cock $y$, Fig. 6, a pressure-gage $u$, a discharge-valve $t$, and a discharge-cock $w$.

The above-mentioned faucet C is inserted into the bung-hole of the barrel to be filled so as to form a tight joint. For this purpose the cone $l$ is provided exteriorly with an india-rubber cover, as indicated at $j$. This rubber-covered cone fits into the bung-hole of the ordinary trade-barrels, and the simple insertion of the same will also be sufficient in the case of the barrels provided with screw-threads as recently introduced.

For facilitating the operation a handle $k$ is provided, which is connected with the cone $l$, and the two parts are of such a weight that when the cone is simply inserted a tight joint will be obtained. When not in use, the faucet is attached by means of a hook $v$ to a bracket $o$, provided on the said vessel. Now when beer is to be introduced from a store-cask or from a filter into a trade-barrel, Fig. 1, the cock of the pipe $a$ is cautiously opened, so that the beer will flow slowly into the receptacle A. For the present the cock $e$ remains closed, while the three-way air-cock $c$ is open and connected by a flexible pipe $z$ with the air-cock $y$, Fig. 6, of the air-vessel B. The beer rises in the receptacle A and displaces all the air, forcing it through the three-way cock, flexible pipe, and cock $y$ in the vessel B, so that the first pressure is produced in this vessel. As soon as the beer commences to issue from the three-way cock the latter is closed and the cock $p$ on the faucet is opened. By this means the barrel is filled with compressed air and receives the first counter-pressure. Thereupon the cocks $e$ and $h$ are opened and the beer is allowed to flow from the receptacle A into the barrel. The air contained in the barrel then escapes through the intermediate space $i$ in the aforesaid cone, the cock $p$, the flexible pipe $q$, into the gage-glass $r$, and through the pipe $s$ into the air-vessel B. In the further passage of beer into the barrel the air in the air-vessel B is compressed and will continually escape through the valve $t$ during the barreling operation when the pressure in the air-vessel B has been raised to 0.2 or 0.3 atmospheres, according as the said valve is adjusted. The latter is weighted proportionately to the pressure at which the beer is to be maintained in the barrel and which is indicated by the pressure-gage $u$. Of course the pressure in the vessel B can never be higher than in the receptacle A, as otherwise the beer will not flow in. The filling operation is continued until the beer rises through the intermediate space $i$, the cock $p$, and the flexible pipe $q$ into the gage-glass $r$, whereupon the cocks $p$ and $h$ are closed and the faucet C is lifted from the bung-hole of the barrel and inserted into that of another barrel to be filled. After the faucet has been inserted tightly into the bung-hole of the second barrel the cock $p$ is opened, whereupon the beer contained in the gage-glass $r$ flows through the pipe $q$, cock $p$, and pipe $n$ into the barrel, and the compressed air in the vessel B is at the same time conducted into the fresh barrel, thereby establishing the counter-pressure. When now the inlet-cock $h$ is opened, the transfer of the beer from the store-cask or filter can take place instantly, and as the necessary counter-pressure will already be in the fresh barrel effervescence is obviated. As through inattention of the operator or because fresh barrels, bungs, or other requisites must be fetched the cocks $h$ and $p$ may not be closed at the moment when the beer appears in the said gage-glass, it is expedient in order to obviate the flow of the beer into the air-vessel B to suspend in the gage-glass $r$ by means of a net $s'$ an india-rubber ball $r'$, which will stop the access to the air-vessel in case the beer rises as far.

It has already been observed that the intermediate pipe $s$ extends to the bottom of the air-vessel B. When the beer is conducted through flexible pipes, cocks, and the like, some carbonic acid becomes free through the friction produced between the beer and the walls. As its specific gravity is greater than the ordinary air, this carbonic acid collects in the lower part of the air-vessel B, so that only air will leave through the discharge-valve $t$. In the production of the counter-pressure in the fresh barrel to be filled by conducting the air under pressure from the air-vessel B to the said barrel the carbonic acid contained in the lowest part of the vessel B is first forced into the barrel, so that no carbonic acid will further separate during the filling, but will combine again with the beer.

For employing the apparatus simultaneously in connection with two barrels the said receptacles are made somewhat larger and the several parts connecting these receptacles with the barrels are made double. In use the three-way cock $c$ is then first set in communication with the small air-cock $y$ upon the cover of the air-vessel by means of the flexible connecting-pipe $z$, Fig. 6, and the beer which enters is caused to force the air from the flexible pipes, the receptacle A, and the gage-glass $b$ through the flexible connecting-pipe $z$ between the three-way cock $c$ and the small air-cock $y$ into the air-vessel, thus establishing the first pressure. Three or four barrels are then placed in position to be filled and the two faucets are inserted into two of these barrels. The air-cock on the faucet of the barrel to be filled first is opened, so that this barrel will be filled with compressed air to produce the counter-pressure. This done, the beer-cock is opened and the beer enters the barrel filled with air. The beer admitted forces the air contained in the barrel through the air-vessel into the second barrel on opening the air-cock with which the faucet of this barrel to be filled is provided. When the second barrel is filled with air, the valve $t$, as the air in the air-vessel and in the second barrel is compressed to a great extent, opens at the pressure to which it has been adjusted. The beer after the filling of the first barrel proceeds through the air-passage and appears in the gage-glass. Both cocks are then closed and the beer-cock of the second barrel is opened. After this the faucet is lifted from the first barrel, the barrel is rapidly closed, and the faucet is inserted into the third barrel. Then the air-cock of this barrel is opened slowly until the requisite counter-pressure has also here been established. In the further barreling the second barrel, when it has been filled with beer, is closed and the above-described operation is repeated. Accordingly it is not necessary in the case of the improved apparatus to establish first the requisite counter-pressure in each barrel by compressed air, as in the apparatus heretofore employed. Compressed air for establishing the counter-pressure is continually obtained in the air-vessel B of my apparatus, which serves at the same time as an expansion-receptacle adapted to compensate for the slightest change which may occur in the counter-pressure during the barreling. This maintenance of a constant pressure constitutes a great advantage both in the direct barreling and in the filtering of the beer, because the beer in the store-cask rises as the pressure decreases and allows the escape of the carbonic acid. However, not only the carbonic acid, but also the alcohol, is retained by the counter-pressure, which is maintained automatically, and the beer is preserved longer both in transport and in bottles.

The beer barreled by means of this improved apparatus effervesces, like champagne, for hours, which is not the case with beer barreled through the medium of other apparatus. Besides these advantages, the one already mentioned is of great importance—namely, that no loss of beer can occur through inattention of the operator. The valve formed in the gage-glass between the barrel to be filled and the air-vessel by the india-rubber ball $r'$, suspended in the net, completely closes the air-vessel when the beer in the gage-glass rises too high and causes a stoppage or an uninjurious interruption of the barreling. Furthermore, the apparatus is extremely simple, has no complicated cocks, and does not require any inconvenient manipulations, so that inexperienced persons can readily use it.

What I claim is—

1. In an apparatus for barreling beer and other aerated liquids, the combination of the receptacle A, having an inlet-pipe $a$ and outlet-cock $e$, the air-vessel B, having a valve $t$ in its upper part, the faucet C, having cock $h$, the flexible pipe $f$, connecting the cock $e$ and faucet C, the pipe $m$, leading from the faucet and provided with cone $l$ and pipe $n$, and the gage-glass $r$, communicating with the air-vessel B and faucet C, substantially as described.

2. In an apparatus for barreling beer and other aerated liquids, the combination of the receptacle A, having an inlet-pipe $a$, cock $e$, and gage-glass $b$, provided with three-way cock $c$, the air-vessel B, having valve $t$ and air-cock $y$, the faucet C, having cock $h$, the flexible pipe $f$, connecting the cock $e$ and faucet C, the pipe $m$, leading from the faucet and having cone $l$ and pipe $n$, adapted to enter a barrel, the cock $p$ on the faucet C, the gage-glass $r$, provided with ball-valve $r'$, the flexible pipe $q$, connecting the cock $p$ and gage-glass $r$, and the pipe $s$, connecting said gage-glass with the interior of the air-vessel, substantially as described.

In testimony whereof I have hereunto signed my name in the presence of two subscribing witnesses.

WILHELM ALBACH.

Witnesses:
ALVESTO S. HOGUE,
JEAN GRUND.